United States Patent
Kim et al.

(10) Patent No.: US 7,233,572 B2
(45) Date of Patent: Jun. 19, 2007

(54) METHOD AND APPARATUS FOR TRANSMITTING PACKET BY USING INDIRECT ACKNOWLEDGEMENT TIMER IN WIRED/WIRELESS INTEGRATED NETWORK

(75) Inventors: Yun Joo Kim, Seoul (KR); Jae Young Ahn, Taejon (KR); Mee Jeong Lee, Seoul (KR)

(73) Assignee: Electronics and Telecommunications Research Institute, Taejon (KR)

( * ) Notice: Subject to any disclaimer, the term of this patent is extended or adjusted under 35 U.S.C. 154(b) by 1105 days.

(21) Appl. No.: 10/183,348

(22) Filed: Jun. 28, 2002

(65) Prior Publication Data

US 2003/0117992 A1 Jun. 26, 2003

(30) Foreign Application Priority Data

Dec. 26, 2001 (KR) .............................. 2001-84878

(51) Int. Cl.
*H04L 1/00* (2006.01)
(52) U.S. Cl. ...................................... 370/236; 370/429
(58) Field of Classification Search ...................... None
See application file for complete search history.

(56) References Cited

U.S. PATENT DOCUMENTS

| | | | |
|---|---|---|---|
| 5,898,671 A * | 4/1999 | Hunt et al. ................. | 370/235 |
| 5,974,028 A | 10/1999 | Ramakrishnan | |
| 6,208,620 B1 | 3/2001 | Sen et al. | |
| 6,282,172 B1 | 8/2001 | Robles et al. | |
| 6,553,032 B1 * | 4/2003 | Farley et al. ................ | 370/394 |
| 6,741,555 B1 * | 5/2004 | Li et al. ...................... | 370/229 |
| 6,744,730 B2 * | 6/2004 | Le et al. ..................... | 370/229 |
| 2002/0089930 A1 * | 7/2002 | Aceves et al. .............. | 370/230 |

OTHER PUBLICATIONS

Ajay V. Bakre and B.R. Badrinath; *Implementation and Performance Evaluation of Indirect TCP;* IEEE Transactions on Computer, vol. 46, No. 3; Mar. 1997; pp. 260-278.
Hari Balakrishman, Srinivasan Seshan, and Randy H. Katz; *Improving Reliable Transport and Handoff Performance in Cellular Wireless Networks;* AMC Wireless Networks, Dec. 1995; pp. 1-18.

* cited by examiner

*Primary Examiner*—Hassan Kizou
*Assistant Examiner*—Anthony Sol
(74) *Attorney, Agent, or Firm*—Lowe Hauptman & Berner LLP

(57) ABSTRACT

A packet transmission apparatus and method is disclosed. The present invention transmits data packets without relaying a duplicate acknowledgement packet by equipping an indirect acknowledgement timer at a buffer, generating/transmitting the indirect acknowledgement packet of the first arrived acknowledgment packet base on the indirect acknowledgement timer and implementing an indirect acknowledgement method to a snoop protocol for overcoming problems of the transmission control protocol (TCP) in the wireless network environment. The present invention effectively utilizes resources of the wireless link, which is wasted during recovering lost packet in the conventional snoop protocol. The present invention also reduces a required size of the buffer of the base station by allowing a partially-generation of the indirect acknowledgement packet.

15 Claims, 6 Drawing Sheets

METHOD AND APPARATUS FOR TRANSMITTING PACKET BY USING INDIRECT ACKNOWLEDGEMENT TIMER IN WIRED/WIRELESS INTEGRATED NETWORK

FIELD OF THE INVENTION

The present invention relates to a method and apparatus for transmitting a packet using indirect acknowledgement mechanism in a wired/wireless integrated network; and, more particularly, to a method and apparatus for transmitting a data packet without treating a duplicate acknowledgement packet by equipping an indirect acknowledgement timer at a buffer, generating/transmitting the indirect acknowledgement packet of the first arrived data packet based on the indirect acknowledgement timer and implementing an indirect acknowledgement method to a snoop protocol for overcoming problems of the transmission control protocol (TCP) in the wireless network environment.

DESCRIPTION OF RELATED ARTS

During data communication between two computer hosts through a wired/wireless link, some packet segments may be lost caused by various conditions of the wired/wireless link and the computers. A conventional transmission control protocol (TCP) has been a reliable transport protocol in traditional networks where congestion is the primary cause of packet loss. The TCP maintains reliable end-to-end packet transmission by assuming all packet loss is caused by congestion. Thus, if a duplicate acknowledgement is arrived or a retransmission time of a transmitter is elapsed, then the TCP invokes a slow start and congestion control mechanism such as setting up a limitation value (ssthresh) of a transmission window as "'congestion control window size'/2" and a congestion control window size as "1" and increasing the transmission window size in geometrical progression for reducing transmission packets and alleviating congestion.

As above-mentioned mechanism of the TCP, the packet loss by the congestion in the wired network can be prevailed and a reliable packet transmission is provided. Therefore, the TCP has been commonly used for providing various application services in the traditional network.

However, networks with wireless links and mobile hosts incur significant losses due to bit-errors and disconnection. The congestion control mechanism of the TCP is unnecessary operation in case of the packet loss generated by the bit error and disconnection in the wireless network.

In the TCP, since it is assumed that all classes of the packet loss are generated by the congestion, the TCP triggers the congestion control, which decreases the congestion control window size to "1", for the packet loss even generated by the bit error and disconnection. The unnecessary operation of the congestion control in the TCP causes wasting resources of the wired link in the wired/wireless integrated network.

For overcoming above-mentioned problem of the TCP in wired/wireless integrated network, an indirect TCP (I-TCP) and snoop protocol are proposed.

For hiding the packet loss from the transmitter, the I-TCP splits an end-to-end TCP connection into two separate connections, a wired TCP connection and a wireless TCP connection, and controls two separated connections independently. The wired TCP connection is a link between a fixed host and a base station and the wireless TCP connection is a link between the base station and a mobile station.

In other word, data packets transmitted from the transmitter are stored into a buffer of the base station and an indirect acknowledgement (I-ACK) is delivered to the transmitter without an acknowledgement of receipt of the data packet from a receiver.

By hiding the packet loss generated in the wireless environment from the transmitter, the unnecessary operation of the congestion control can be eliminated. Therefore, the I-TCP guarantees high-speed data transmission in the wireless network environment since a round trip time between the transmitter and the base station is only consideration factor for data transmission.

The congestion control of the TCP, decreasing a size of the congestion control window of the transmitter, is the unnecessary operation, if the data loss is not generated by the congestion. The snoop protocol is proposed for reducing above-mentioned unnecessary operations of the TCP in the wireless network. The snoop protocol is implemented at a boundary between the wireless link and the wired link.

The snoop protocol implemented base station stores transmitted data packet in the buffer of the base station and predicts the packet loss. If a preset time limit of a local retransmission timer is elapsed or the duplicated acknowledgement is arrived, then the snoop protocol assumes an incurrence of the packet loss and retransmits stored transmitted data packet in the buffer corresponding to predicted damaged or lost packets without transmitting the duplicate acknowledgement to the transmitter.

By retransmitting the damaged or lost packets without noticing predicted packet loss to the transmitter, it prevents performing the unnecessary operation of conventional TCP. Therefore, a performance of packet transmission in the wireless network environment is improved.

However, the I-TCP, which is proposed for prevailing disadvantage of the TCP, violates end-to-end semantics of the TCP. As a result of violation, the I-TCP does not guarantee a reliable TCP transmission.

The I-TCP mechanism controls independently links between the transmitter and the receiver so the transmitter maintains high-speed transmission even though the wireless link has been disconnected for a long period time or the packet has been lost continuously. However, the base station has to store numerous transmitted packets into the buffer. Therefore, I-TCP mechanism needs a huge size of the buffer for storing numerous packets and it causes a buffer-overhead problem.

The snoop protocol, which is introduced for overcoming disadvantage of the TCP, also has disadvantage, wasting resources of the wired link. The snoop protocol does not notice the packet loss generated in the wireless link between the base station and receiver to the transmitter while maintaining the end-to-end semantics of TCP. The transmitter, therefore, stops packet transmission until an acknowledgement is arrived from the receiver and as a result, the resource of wired link, which has a wider bandwidth comparing to the wireless link, is wasted.

Additionally, the snoop protocol does not perfectly hide the packet loss from the transmitter due to the end-to-end semantics of TCP, which is used by the snoop protocol, so the retransmission time is elapsed at the transmitter and a slow start of the TCP may be started in case that recovering a lost packet takes such a long period time.

Therefore, the snoop protocol also has a limitation to improve a performance of transmission protocol.

SUMMARY OF THE INVENTION

It is, therefore, an object of the present invention to provide a packet transmission apparatus and method for reducing a possibility to occur a retransmission timeout, which is occurred in a transmitter and a computer readable record medium storing instructions for executing the method.

It is another object of the present invention to provide a packet transmission apparatus and method for reducing a required size of a buffer in a base station, in which a transmitted packet is stored and a computer readable record medium storing instructions for executing the method.

It is further another object of the present invention to provide a packet transmission apparatus and method, in which an indirect acknowledgement mechanism is implemented, for maintaining a reliable packet transmission of the TCP wherein, the indirect acknowledgement mechanism predicts a delay of packet transmission and a packet loss generated in a wireless link by providing an indirect acknowledgment timer in a snoop protocol implemented base station and to provide a computer readable record medium storing instructions for executing the method.

In accordance with an aspect of the present invention, there is provided a method for transmitting a packet in a packet transmission apparatus connected to a transmitter through a wired link and connected to a receiver through a wireless link, including the steps of: a) setting up an indirect acknowledgement timer to a data packet received from the transmitter, storing the data packet into a buffer and transmitting the data packet to receiver; b) updating a size of the buffer based on a acknowledgement packet received from the receiver and treating the data packet received from the transmitter; and c) transmitting an indirect acknowledgement packet to the transmitter according to a state of the buffer in case an acknowledgement packet is not received from the receiver until the indirect acknowledgement timer is elapsed.

In accordance with another aspect of the present invention, there is also provided a packet transmission apparatus connected to a transmitter through a wired link and connected to a receiver through a wireless link, including: a transceiver for the transmitter connected with the transmitter through the wired link, for receiving a data packet and transmitting an acknowledgement packet or an indirect acknowledgement packet; a transceiver for the receiver connected with the receiver through the wireless link, for transmitting a data packet and receiving the acknowledgement packet; a buffer for storing a data packet received from the transmitter; and an indirect acknowledgement controller for establishing an indirect acknowledgement timer to a data packet stored in the buffer, setting up a size of the buffer base on the acknowledgement packet received from the transceiver for the receiver and generating an indirect acknowledgement packet according to whether the buffer is overflowed in case the acknowledgement packet is not received from the receiver until the indirect acknowledgement timer is elapsed.

In accordance with further another aspect of the present invention, there is also provided a computer readable record medium storing instructions for executing a method for transmitting a packet in a packet transmission apparatus, the method including the steps of: a) setting up an indirect acknowledgement timer to a data packet received from the transmitter, storing the data packet into a buffer and transmitting the data packet to receiver; b) updating a size of the buffer based on a acknowledgement packet received from the receiver and treating the data packet received from the transmitter; and c) transmitting an indirect acknowledgement packet to the transmitter according to a state of the buffer in case an acknowledgement packet is not received from the receiver until the indirect acknowledgement timer is elapsed.

BRIEF DESCRIPTION OF THE DRAWINGS(S)

The above and other objects and features of the present invention will become apparent from the following description of the preferred embodiments given in conjunction with the accompanying drawings, in which.

Figure 6A:
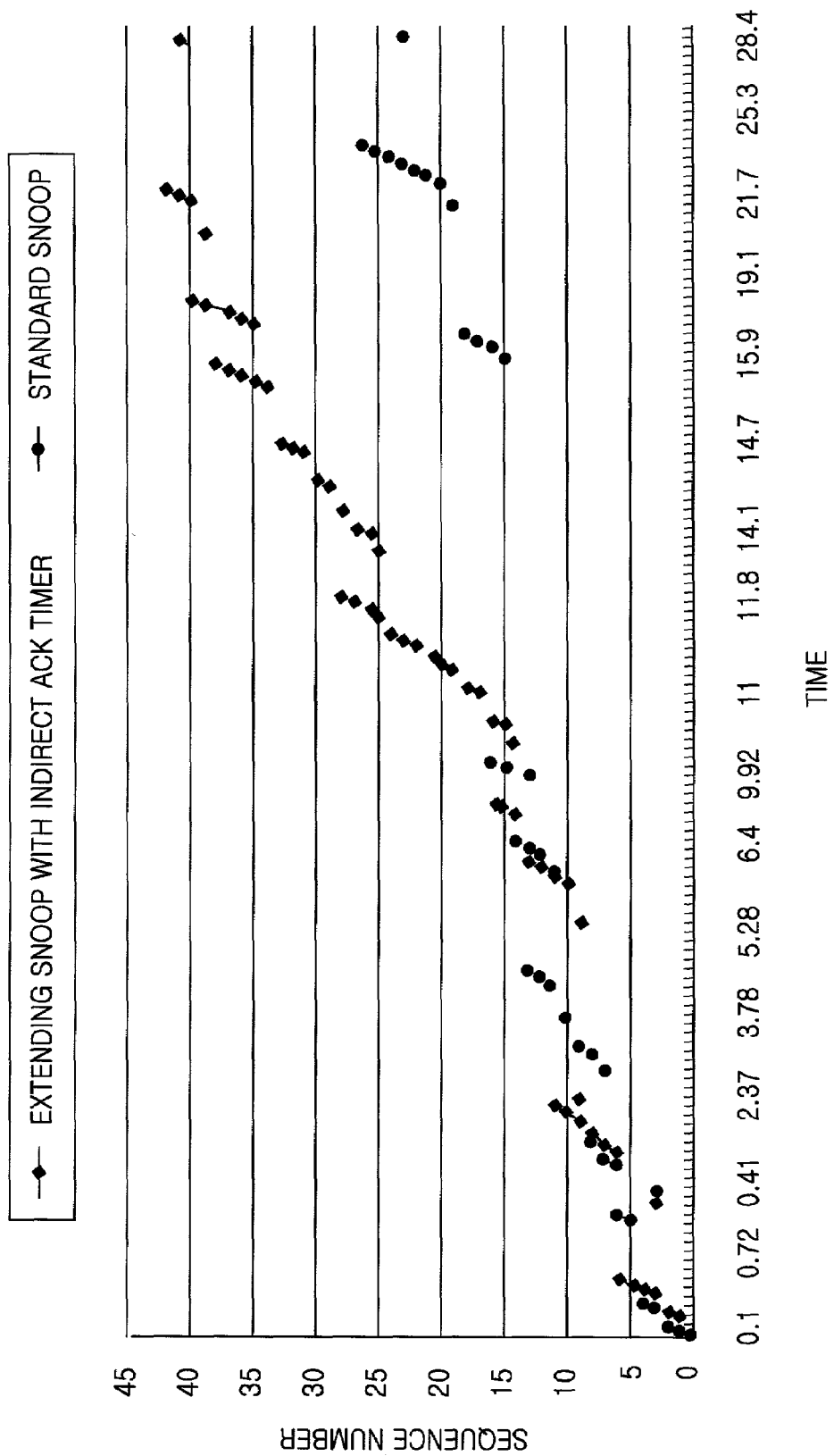
Figure 6B:
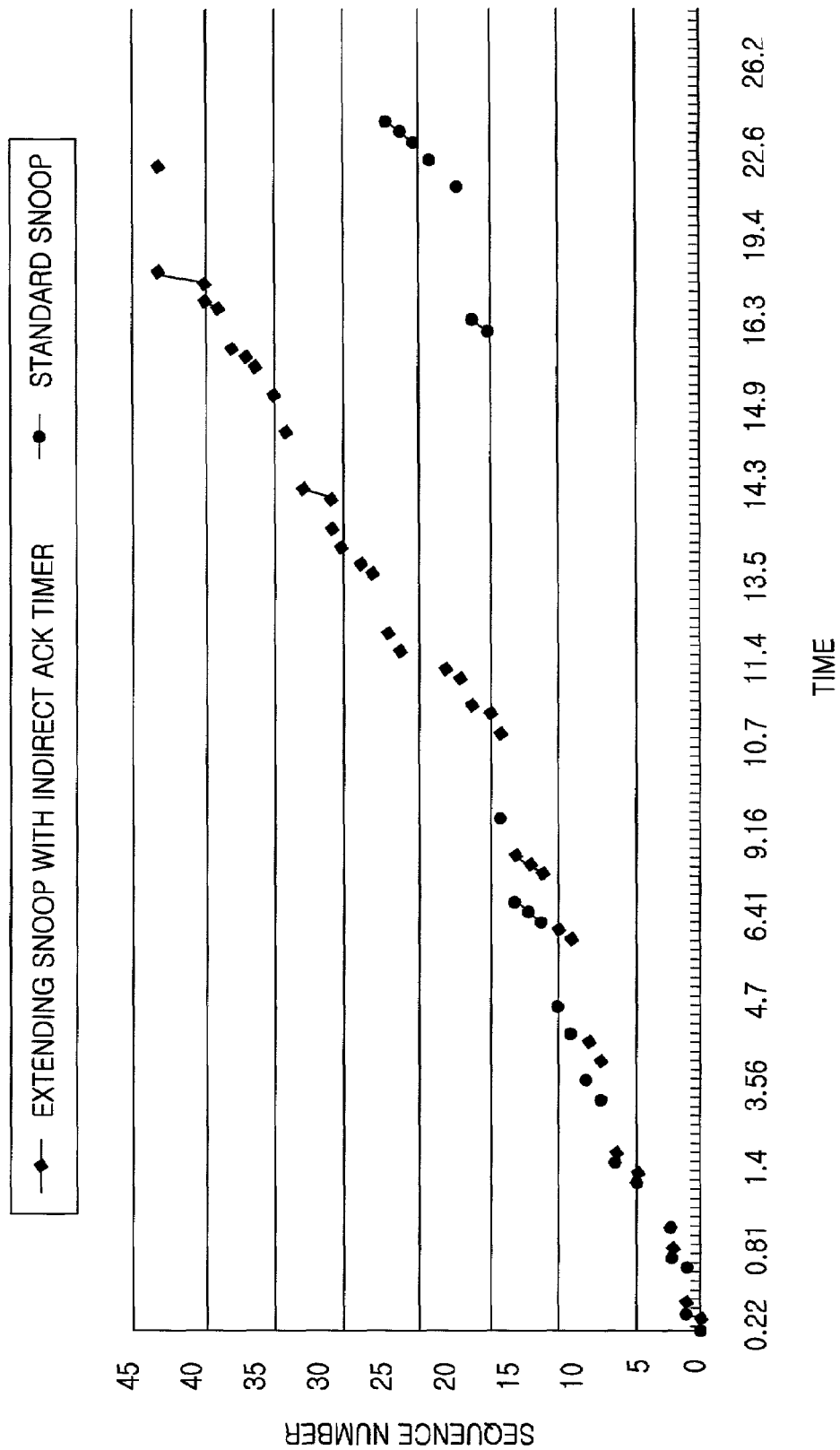

FIG. 6A is a graph depicting a comparison between quantity of data packets, which is transmitted from a transmitter to a base station in accordance with the present invention, and quantity of data packets, which is transmitted from transmitter to a conventional snoop protocol implemented base station; and FIG. 6B is a graph depicting a comparison between quantity of data packets, which is transmitted from a transmitter to a receiver in accordance with the present invention, and quantity of data packets, which is transmitted from transmitter to a conventional snoop protocol implemented receiver.

DETAILED DESCRIPTION OF THE INVENTION

Other objects and aspects of the invention will become apparent from the following description of the embodiments with reference to the accompanying drawings, which is set forth hereinafter.

Figure 1:
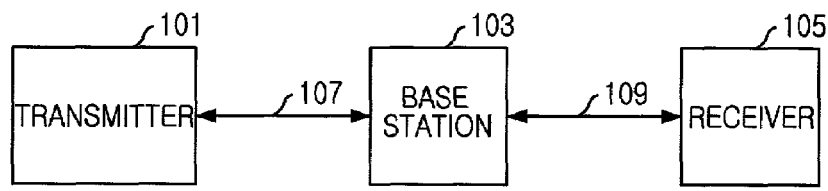
FIG. 1 is a block diagram illustrating a wired/wireless integrated network in which the present invention is implemented.
Figure 2:
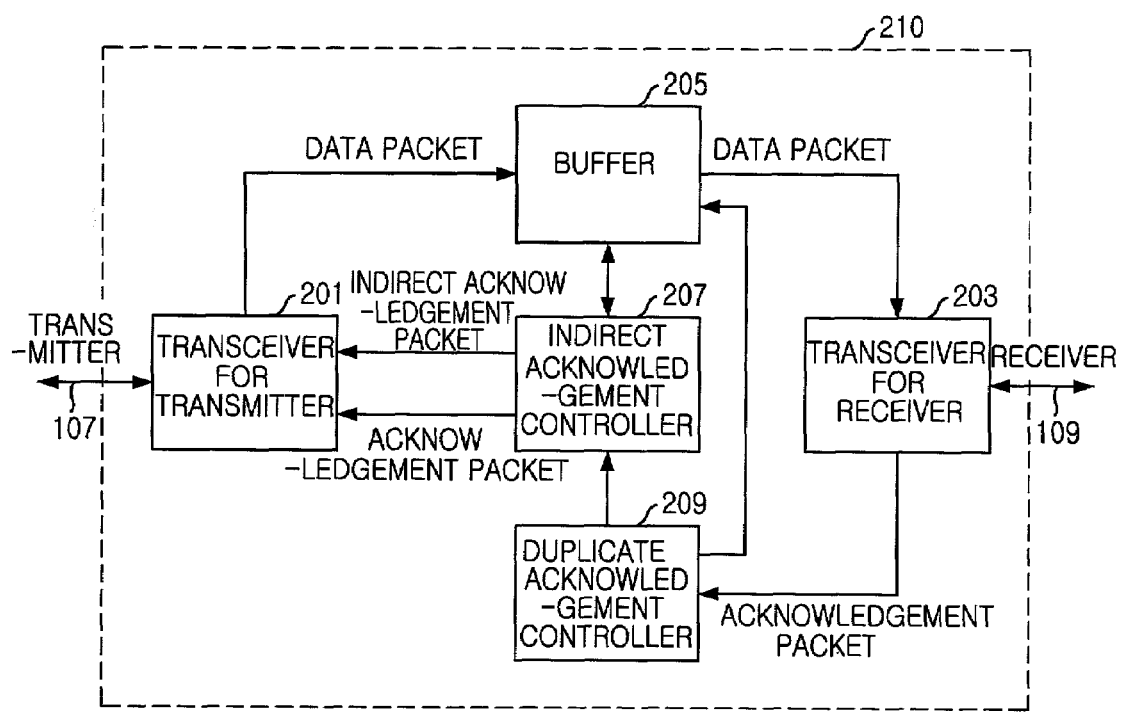
FIG. 2 is a block diagram illustrating a packet transmission apparatus in accordance with the preferred embodiment of the present invention.

FIG. 1 is a block diagram illustrating a wired/wireless integrated network in which the present invention is implemented and FIG. 2 is a block diagram illustrating a packet transmission apparatus in accordance with the preferred embodiment of the present invention. The wired/wireless integrated network includes a transmitter 101, a wired link 107, a base station 103, a wireless link 109 and a receiver 105. The wired link 107 is a data communication medium, which transports data in 10 Mbps and has 100 ms as a transmission delay. The wireless link 109 is a data communication medium, which transports data in 2 Mbps and has 10 ms as the transmission delay. The packet transmission apparatus in accordance with the present invention is implemented in the base station 103.

A conventional TCP is implemented in the wired link 107 and the wireless link 109. The receiver 105 is established according to an improved snoop protocol algorithm in accordance with the present invention.

The base station 103 includes the transmitter 101, a transceiver for a transmitter 201 for packet transmission, the receiver 105, a transceiver for a receiver 203. The configuration of the base station with above-mentioned elements can be composed as various forms.

The packet transmission apparatus 210 controls a packet transmission between the transmitter 101 and the receiver 105 according to the improved snoop protocol in accordance with the preset invention.

Referring to FIG. 2, the packet transmission apparatus 210 includes a transceiver for a transmitter 210, a transceiver for a receiver 201, a buffer 205, an indirect acknowledgement controller 207 and a duplicate acknowledgement controller 209.

The transceiver for the transmitter 201 makes a connection between the transmitter 101 and the packet transmission apparatus 210 through the wired link 109 and the transceiver for the receiver 203 couples the receiver 105 and the packet transmission apparatus 210 through the wireless link 109.

The transceiver for the transmitter 201 receives a data packet from the transmitter 101 and transmits the acknowledgement packet and the indirect acknowledgement packet. The transceiver for the receiver 203 transmits a data packet to the receiver 105 and receives the acknowledgement.

The buffer 205 stores the data packet received from the transmitter 101.

The indirect acknowledgement controller 207 sets up a time of an indirect acknowledgement timer according to a stored data packet in the buffer 205 and deletes the stored data packet base on a newly received acknowledgement packet. The indirect acknowledgement controller 207 also controls a variable capacity of the buffer 205 for preventing a buffer overflow and generates/transmits the indirect acknowledgement by determining whether the indirect acknowledgement timer is elapsed.

The duplicate acknowledgement controller 209 determines whether the received acknowledgement from the receiver 105 is a duplicate acknowledgement, retransmits data packet stored in the buffer 205 and counts the duplicate acknowledgement packets.

Operation steps of the packet transmission apparatus 210 in accordance with the preferred embodiment of the preset invention is explained in detail as follows.

At first, the indirect acknowledgement controller 207 stores data packets received from the transmitter 101 into the buffer 205 and sets up the indirect acknowledgement timer according to the stored data packet and transmits data packets to the receiver 105 through the transceiver for the receiver 203.

After transmitting data packets, if an acknowledgement is received from the receiver 105 through the transceiver for the receiver 203, the duplicate acknowledgement controller 209 determines whether the received acknowledgement is a newly received acknowledgement or a duplicate acknowledgement. If the received acknowledgement is the duplicate acknowledgement, then the duplicate acknowledgement controller 209 determines whether the duplicate acknowledgement is the first duplicate acknowledgement and retransmits the damaged or lost data packet according to a result of determination.

If the received acknowledgement is the newly received acknowledgement, then the indirect acknowledgement controller 207 calculates a round trip time (RTT) according to successfully received data packet at the receiver 105 and changes the size of the buffer (205). The indirect acknowledgement controller 207 also deletes a data packet corresponding to the received acknowledgement in the buffer 205 and sets up an indirect acknowledgement timer of a next data packet of the deleted data packet in the buffer.

Additionally, the indirect acknowledgement controller 207 determines whether an indirect acknowledgement of a data packet corresponding to the received acknowledgement is already transmitted and transmits the acknowledgement packet to the transmitter 101.

In a meantime, the indirect acknowledgement controller 207 checks an indirect acknowledgement timer set up according to a data packet transmitted to the receiver 105 through the transceiver 203 for the receiver. If the acknowledgement packet from the receiver 105 was not transmitted to the packet transmission apparatus 205 even though the indirect acknowledgement timer of the stored data packet in the buffer 205 is elapsed, then the indirect acknowledgement controller 207 checks whether the capacity of the buffer is overflow. If the capacity of the buffer is not overflow, then the indirect acknowledgement controller 207 generates and transmits an indirect acknowledgement packet to the transmitter 101 through the transceiver for the transmitter 201. By generating and transmitting the indirect acknowledgement packet to the transmitter 101 according to a result of checking the buffer. The transmitter 101 can transmit data packet continuously, therefore, a resource of the wired link, which is wasted during recovering a lost packet, can be utilized effectively.

Figure 3:
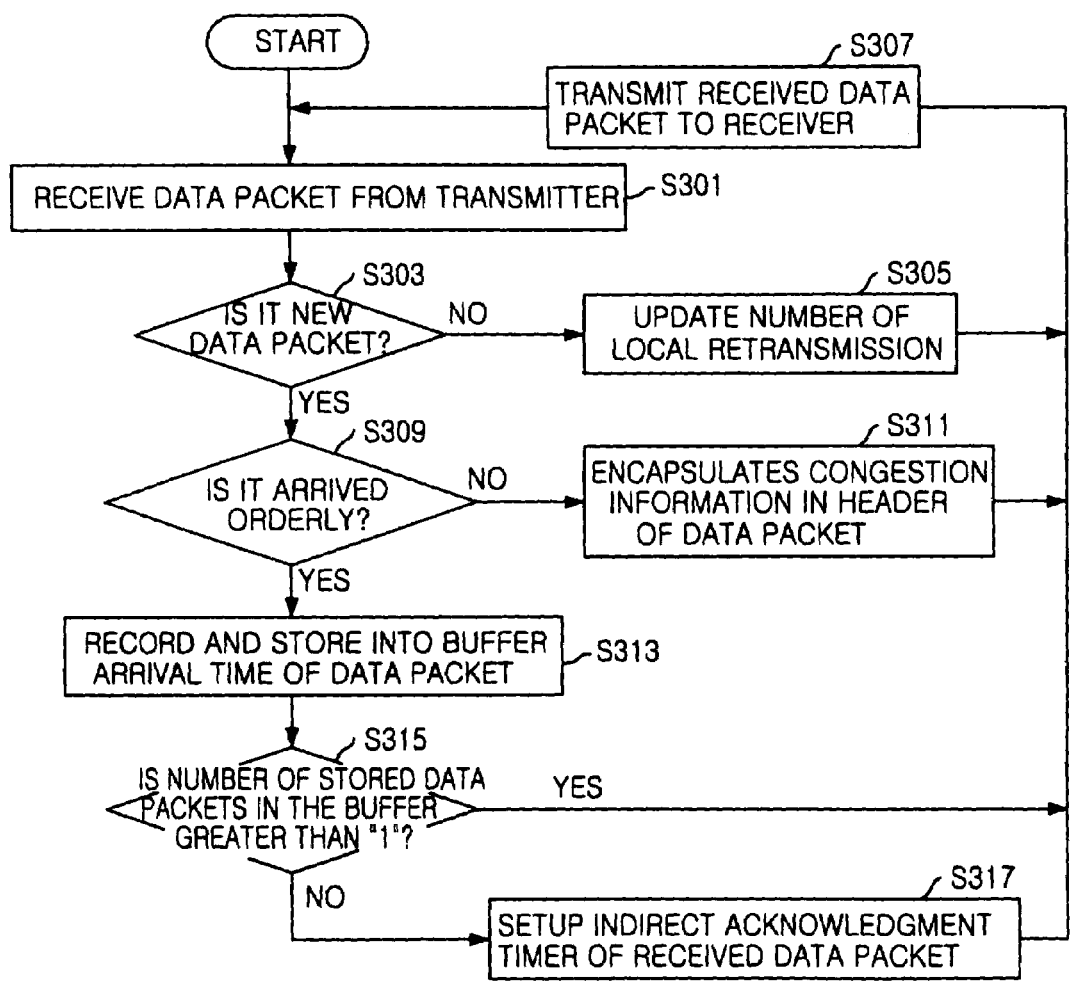
FIG. 3 is a flowchart illustrating steps of setting an indirect acknowledgement timer according to a transmitted data packet from a transmitter in accordance with the preferred embodiment of the present invention.

FIG. 3 is a flowchart illustrating steps of setting an indirect acknowledgement timer of a transmitted data packet from a transmitter in accordance with the preferred embodiment of the present invention.

At first, an indirect acknowledgement controller 207 of a packet transmission apparatus 210 determines whether a received data packet is a newly received data packet when a receiver 101 receives the data packet through a transceiver for the transmitter 201 at step 301.

After determining, if the data packet is not newly received packet, then the indirect acknowledgement controller 207 recognizes the data packet as a retransmitted data packet from the transmitter 101 to the packet transmission apparatus 210 and sets up a number of local retransmission of the received data packet in the packet transmission apparatus 210 as "0" at step 305.

After setting up the number of local retransmission, the indirect acknowledgement controller 207 transmits the received data packet through the transceiver for the receiver 203 at step 307. In here, the number of local retransmission is initialized by the TCP.

After step 303, if the data packet is newly received packet, then the indirect acknowledgement controller 207 checks whether the data packet is orderly arrived at step 309.

After checking the order of the data packet at step 309, if the data packet is arrived in order, then the indirect acknowledgement controller 207 records an arrival time of the received data packet and stores the received data packet into the buffer 205 at step 313.

After step 313, the indirect acknowledgement controller 207 checks whether a number of stored data packet at the buffer 205 is more than "1" at step 315.

If the number of stored data packet is more than "1", then the indirect acknowledgement controller 207 transmits the received data packet to the receiver 105 through the transceiver for the receiver 203 at step 307.

If the number of stored data packet is "1", then the received data packet is the first arrived data packet therefore, the indirect acknowledgement controller 207 sets up an indirect acknowledgement timer of the received data packet at step 317.

In other word, the transmitter 101 of the present invention can transmit data packets as many as the buffer of the packet transmission apparatus can hold in despite of a packet loss and transmission delay, which can be produced in the wireless link, by storing received data packet into the buffer 205, setting up the indirect acknowledgement timer, and generating/transmitting the indirect acknowledgement packet to the receiver 101 in case the acknowledgement packet is not arrived from the receiver 105 until the indirect acknowledgement timer is elapsed.

As above-mentioned steps of setting the indirect acknowledgement timer of a received data packet from the transmitter, the present invention utilizes the resource of wired link effectively.

Figure 4:
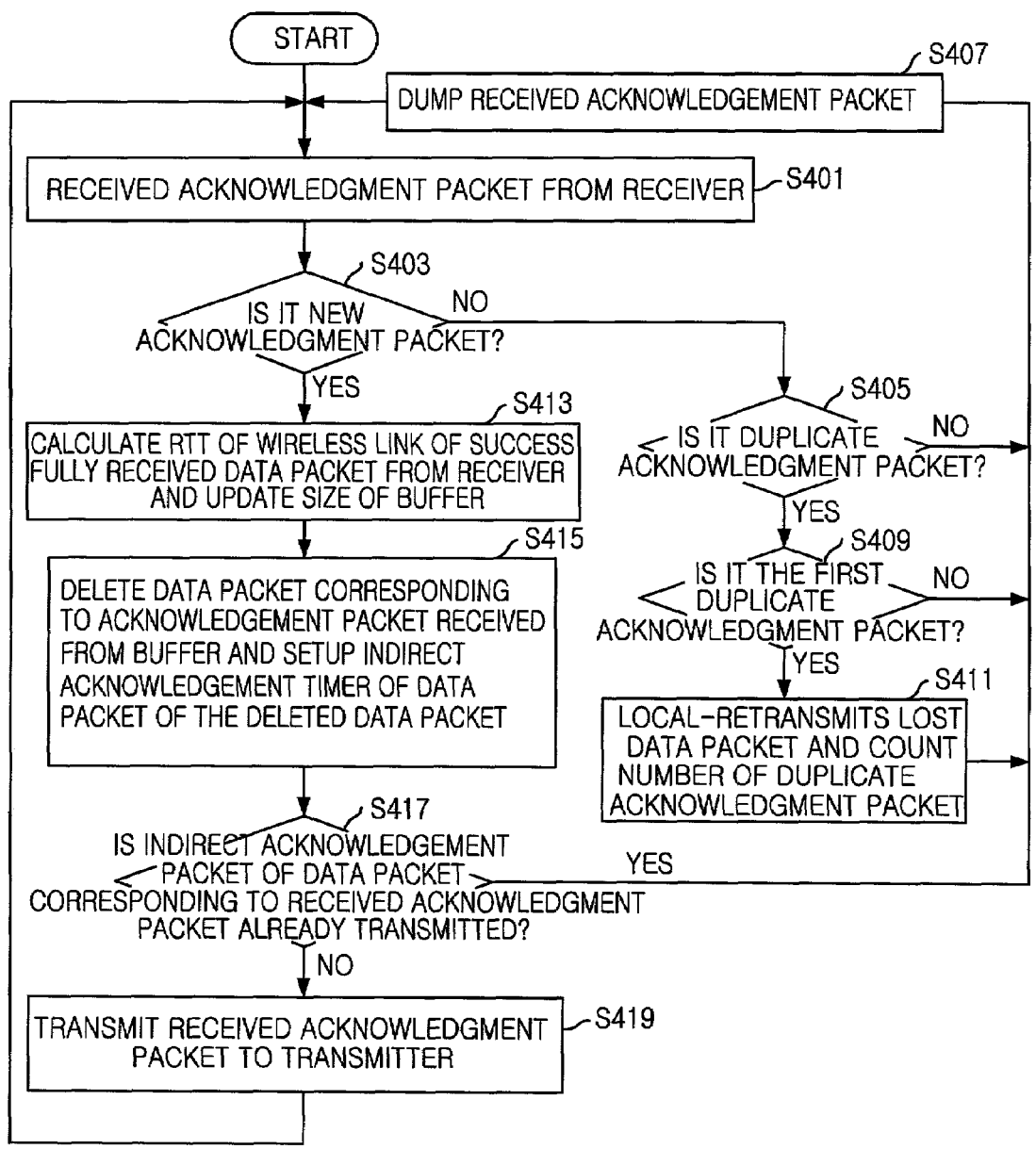
FIG. 4 is a flowchart illustrating steps of establishing the indirect acknowledgement timer when an acknowledgement packet is received from a receiver in accordance with the present invention.

FIG. 4 is a flowchart illustrating steps of establishing the indirect acknowledgement timer when an acknowledgement packet is received from a receiver in accordance with the present invention.

At first, a packet transmission apparatus 210 receives an acknowledgement packet transmitted from a receiver 105 through a transceiver for a receiver 203 at step 401. A duplicate acknowledgement controller 209 determines whether the received acknowledgement packet is newly arrived acknowledgement packet by comparing a sequence number of a data packet corresponding to the received acknowledgement with another sequence number of a data packet corresponding to an acknowledgement received previously than the received acknowledgement packet at step 403.

If the received acknowledgement packet is newly arrived acknowledgement packet, then the indirect acknowledgement controller 207 calculates a wireless round trip time (RTT) of the successfully arrived acknowledgement packet at step 413. After calculating the RRT of the wireless link, the indirect acknowledgement controller 207 deletes data packets corresponding the arrived acknowledgement packet in the buffer and sets up a start time of the indirect acknowledgement timer of a data packet, which is a next data packet of the deleted data packet at step 415.

The RTT is a time taken for round trip of data transmission between both ends. A local retransmission timer is set up by considering the RTT in the packet transmission apparatus 210. By using the RTT, a number of data packets, which can be successfully transmitted during a transmission delay time of a wired link, can be calculated and the number of the data packet is used for calculating a size of the buffer. The size of the buffer is calculated by below equation (1).

$$\text{Size of buffer} = \frac{RTT \text{ of wireless link} + \text{retransmission time out of base station}}{RTT \text{ of wireless link}} \quad \text{Eq. (1)}$$

After the step 415, the indirect acknowledgement controller 207 determines whether the data packet corresponding to a sequence number of the newly arrived acknowledgement packet is acknowledged to the transmitter 101 by the indirect acknowledgement generated from the indirect acknowledgement controller 207 of the packet transmission apparatus 210 at step 417.

In other word, it is determined that the transmitter recognizes a succession of arriving the data packet at the receiver by the indirect acknowledgement packet is generated and transmitted to the transmitter. The transmitter 101 recognizes the indirect acknowledgement packet and the acknowledgement packet as identical packet so if one of packet in both acknowledgement packets is arrived at the transmitter 101, then the transmitter 101 believes that the data packet is transmitted successfully.

After the step 417, if the data packet corresponding to the received acknowledgement has already been acknowledged by the indirect acknowledgement of the transmitter 101, then the received acknowledgement packet is dumped at step 407.

In a case that a data packet corresponding to the received acknowledgement packet is already acknowledged to the transmitter 101 by the indirect acknowledgement packet, the indirect acknowledgement controller 207 generates and transmits the indirect acknowledgement packet to the transmitter 101 without transmitting an acknowledgment packet of a packet loss or transmission delay generated in the wireless link to the packet transmission apparatus 210 when the indirect acknowledgment timer is elapsed.

After the step 417, if the data packet corresponding to the received acknowledgement packet is not acknowledged by the transmitter 101, then the received acknowledgement packet is transmitted to the transmitter 101 through the transceiver for the transmitter 201 and corresponding data packet is acknowledged at step 419.

In a meantime, if a result of the determination at step 403 is that the received acknowledgement packet is not newly arrived acknowledgement packet, then the duplicate acknowledgement controller 209 determines whether the received acknowledgement packet is a duplicate acknowledgement packet by comparing a sequence number of data packet corresponding to the received acknowledgement packet with another sequence number of data packet corresponding to an acknowledgement packet received previously than the received acknowledgement packet at step 405.

If the received acknowledgement packet is not duplicate acknowledgement packet, then it is an acknowledgement packet of data packet already deleted from the buffer 205, therefore, the received acknowledgement packet is dumped at step 407.

However, if the received acknowledgement packet is the duplicate acknowledgement packet, then the duplicate acknowledgement controller 209 determines whether the received acknowledgement is the first arrived duplicate acknowledgement packet referring to a count of the received duplicate acknowledgement packet, which is explained in below, at step 405 and if it is not the first arrived duplicate acknowledgement packet, then the received duplicate acknowledgement packet is dumped at step 407.

If the received acknowledgement packet is the first arrived and duplicate acknowledgement packet, then it means that there is a data loss in the wireless link therefore, the duplicate acknowledgement controller 209 locally retransmits a data packet, which is a lost data packet stored in the buffer 205, to the receiver 105 through the transceiver for the receiver 203 and counts the number of received duplicate acknowledgement packets at step of 411. The received duplicate acknowledgement packets are dumped at step 407.

At step of 411, the duplicate acknowledgement controller 209 counts the number of received duplicate acknowledgement packets for determining whether the received duplicate acknowledgement packet is the first arrived duplicate acknowledgement packet.

In other word, if the indirect acknowledgement controller 207 receives the acknowledgement packet of transmitted data packet from the receiver 105, then the number of data packet is controlled to be increased by analyzing a state of the wireless link and altering a capacity of the buffer 205. And on the other hand it is controlled not to send the acknowledgement packet of data packet, of which indirect acknowledgement packet had already been sent. The data packet corresponding to the received acknowledgement packet is deleted from the buffer and the buffer 205 of the packet transmission apparatus 210 is controlled not to be overflowed by establishing the indirect acknowledgement timer at data packets stored in the buffer 205.

Figure 5:
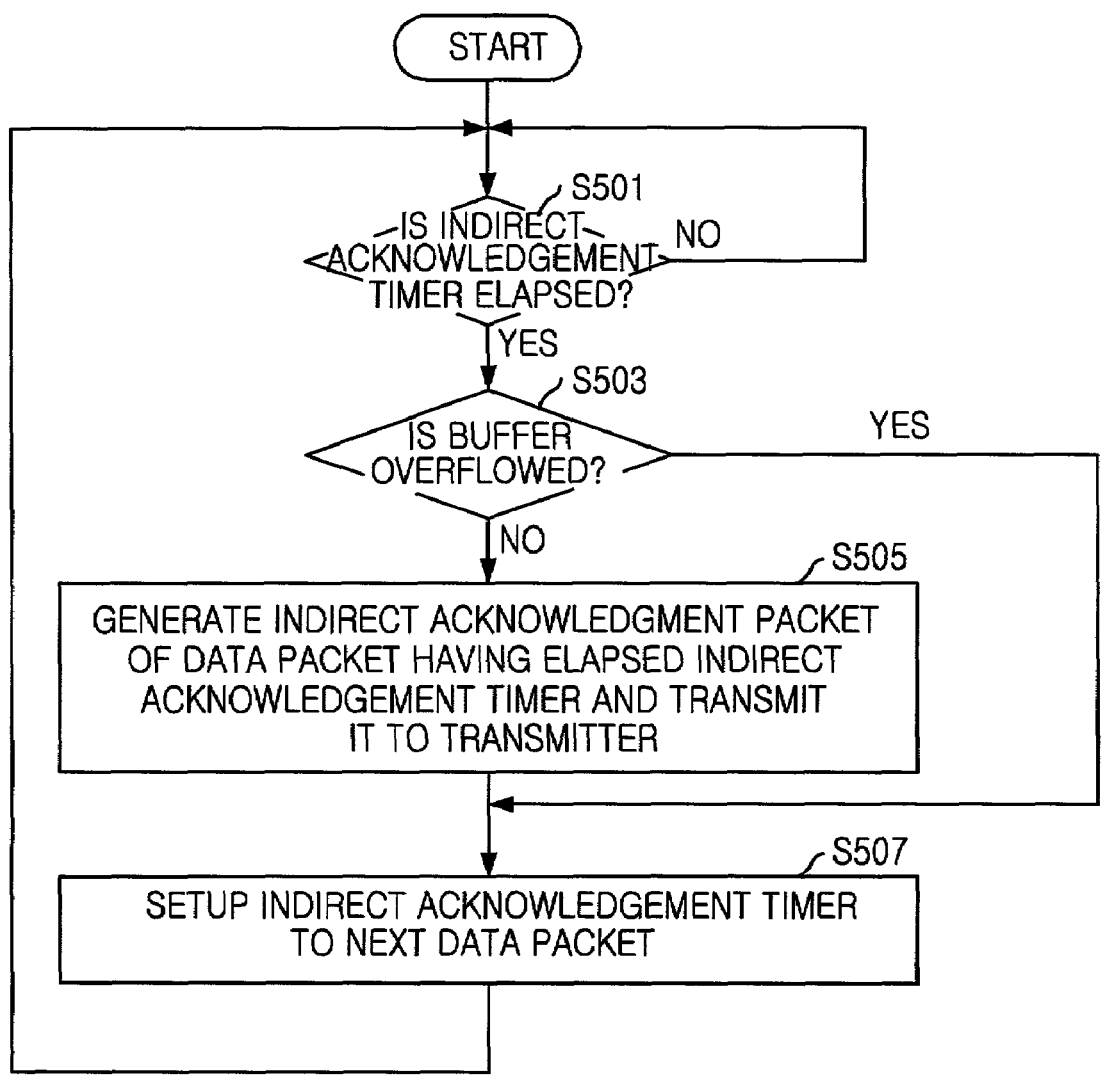
FIG. 5 is a flowchart illustrating steps of processing data packet stored in a buffer when a preset time of the indirect acknowledgement timer is elapsed in accordance with the present invention.

FIG. 5 is a flowchart illustrating steps of processing data packet stored in a buffer when a preset time of the indirect acknowledgement timer is elapsed in accordance with the present invention.

The indirect acknowledgement timer is established to data packets in the buffer and the indirect acknowledgement controller 207 sets up a time of indirect acknowledgement.

At first, if a preset time of the indirect acknowledgment timer is elapsed, then it means that multiple packets, which are retransmitted to the receiver 105, are continuously lost, or the acknowledgement packet from the receiver 105 to the packet transmission apparatus 210 is lost. Therefore, a condition of the buffer is determined and the indirect acknowledgement packet is transmitted.

The indirect acknowledgement controller 207 determines whether the indirect acknowledgment timer is elapsed at step 501. If the preset time of the indirect acknowledgement timer is elapsed, then the indirect acknowledgement controller 207 determines whether the buffer is overflowed by stored data packets at step 503.

After step 503, if the buffer is not overflowed, then the indirect acknowledgement packet of the first received and stored data packet in the buffer 205 is generated and transmitted to the transmitter 101 through the transceiver for the transmitter 201 at step 505. The indirect acknowledgement timer is established to a received and stored data packet, which is a next data packet of data packet corresponding to the generated indirect acknowledgement packet at step 507. A standard time of the indirect acknowledgement timer is a time of receiving and storing corresponding data packet into the buffer 205.

After step 503, if the buffer is overflowed, then the indirect acknowledgement of the received and stored data packet is not generated and the indirect acknowledgement timer is established to a next received and stored data packet of the data packet at step 507.

The indirect acknowledgement mechanism is implemented in case the buffer is not overflowed which means a number of stored data packet in the buffer is not exceeded to threshold value of the buffer therefore, the reliable communication link of TCP can be maintained since the generation of the indirect acknowledgement packet is allowed partially for reducing required buffer size and recovering violated TCP connection between two ends by the indirect acknowledgment packet.

FIG. 6A is a graph depicting a comparison between quantity of data packets, which is transmitted from a transmitter to a base station in accordance with the present invention, and quantity of data packets, which is transmitted from transmitter to a conventional snoop protocol implemented base station and FIG. 6B is a graph depicting a comparison between quantity of data packets, which is transmitted from a transmitter to a receiver in accordance with the present invention, and quantity of data packets, which is transmitted from transmitter to a conventional snoop protocol implemented receiver.

The simulation graph uses FTP data as input data for transmitting data packet immediately when an acknowledgement packet is arrived by filling data packets in the TCP queue of a transmitter and compares a quantity of successfully transmitted data packet in a certain simulation time by the present invention and a quantity of successfully transmitted data packet in the certain simulation time by the snoop protocol.

The transmitter of the present invention does not distinguish the indirect acknowledgement packet and the acknowledgement packet transmitted from the receiver therefore, the base station can transmit data during maintaining a specific limitation condition of the buffer. By transmitting data while specific limitation condition is satisfied, as shown in FIG. 6A, a pause time of the transmitter can be reduced and plenty of data packet can be transmitted. Finally, as shown FIG. 6B, the present invention can transmit successfully data packets between the receiver and the transmitter furthermore, it shows improved quality of the wired/wireless integrated network environment.

As above-mention method in accordance with the preferred embodiment of the present invention can be implemented as a program for executing the method and it can be stored in a computer readable record medium such as a CD-ROM, a RAN, a ROM, a floppy disk, a hard disk and an optical magnetic disk.

The above-mentioned present invention effectively utilizes resources of the wired link between the transmitter and the base station, which is wasted during recovering lost packet in the conventional snoop protocol by adding the above-mentioned present invention mechanism and the indirect acknowledgement timer at the base station implementing the snoop protocol and using the indirect acknowledgement mechanism for persistently transmitting data to the transmitter, which does not classify the indirect acknowledgement packet and the acknowledgement packet from the receiver. The present invention also reduces a required size of the buffer of the base station by allowing a partially-generation of the indirect acknowledgement packet, which only generates the indirect acknowledgement in case the number of data packets stored in the buffer is less than the thresh hold value of the buffer.

While the present invention has been described with respect to certain preferred embodiments, it will be apparent to those skilled in the art that various changes and modifications may be made without departing from the scope of the invention as defined in the following claims.

what is claimed is:

1. A method for transmitting a packet in a packet transmission apparatus connected to a transmitter through a wired link and connected to a receiver through a wireless link, comprising the steps of:

a) setting up an indirect acknowledgement timer to a data packet received from the transmitter, storing the data packet into a buffer and transmitting the data packet to the receiver;

b) updating a size of the buffer based on an acknowledgement packet received from the receiver and treating the data packet received from the transmitter; and c) transmitting an indirect acknowledgement packet to the transmitter according to a state of the buffer in case an acknowledgement packet is not received from the receiver until the indirect acknowledgement timer is elapsed, wherein step b) includes the steps of:

b1) if the acknowledgment packet is a new acknowledgement packet, changing a size of the buffer by calculating a round trip time (RTT) of the wireless link;

b2) deleting the data packet corresponding to the acknowledgement packet received from the buffer;

b3) setting up the indirect acknowledgement timer to a data packet stored in the buffer, which is the next data packet of the deleted data packet; and b4) determining whether the indirect acknowledgement packet of the data packet corresponding to said received acknowledgement packet is transmitted, and if the indirect acknowledgement packet is not transmitted, transmitting the received acknowledgement packet to the transmitter.

2. The method as recited in claim 1, wherein said step b), if the received acknowledgement packet is the first duplicate acknowledgement packet, includes the steps of:

b1) retransmitting a data packet corresponding to the received acknowledgement packet, if the data packet is stored in the buffer; and b2) counting the received duplicate acknowledgement packets.

3. The method as recited in claim 1, wherein the size of the buffer is updated according to a value calculated by an equation as:

$$\text{Size of buffer, (treshold)} = \frac{RTT \text{ of wireless link} + \text{retransmission time out of base station}}{RTT \text{ of wireless link}}.$$

4. The method as recited in claim 1, wherein said step c) includes the steps of:

c1) in case the buffer is not overflowed, generating an indirect acknowledgement packet corresponding to data packet of which the indirect acknowledgement timer is elapsed and transmitting the indirect acknowledgement packet to the transmitter; and c2) establishing an indirect acknowledgement timer to a data packet stored in the buffer, which is a next data packet of the data packet of which the indirect acknowledgment timer is elapsed.

5. The method as recited in claim 1 wherein, said step a) includes the steps of:

a1) recording an arrival time of the received data packet from the transmitter and storing the received data packet into the buffer;

a2) establishing the indirect acknowledgement timer to the received data packet in case the number of stored data packets in the buffer is not greater than "1"; and a3) transmitting the received data packet to the receiver.

6. The method as recited in claim 5, wherein said step a) further includes the step a4), in case the received data packet from the transmitter is not new data packet, setting up a new number of local retransmission and transmitting the received data packet to the receiver.

7. The method as recited in claim 5, wherein said step a) further comprises the step a4), in case the received data packet from the transmitter is not orderly received data packet, encapsulating a congestion information into header of the received data packet header and transmitting the received data packet to the receiver.

8. A packet transmission apparatus connected to a transmitter through a wired link and connected to a receiver through a wireless link, comprising:

a transceiver for the transmitter connected with the transmitter through the wired link, for receiving a data packet and transmitting an acknowledgement packet or an indirect acknowledgement packet;

a transceiver for the receiver connected with the receiver through the wireless link, for transmitting a data packet and receiving the acknowledgement packet;

a buffer for storing a data packet received from the transmitter; and an indirect acknowledgement controller for establishing an indirect acknowledgement timer to a data packet stored in said buffer, setting up a size of the buffer based on the acknowledgement packet received from the transceiver for the receiver and generating an indirect acknowledgement packet according to whether the buffer is overflowed in case the acknowledgement packet is not received from the receiver until the indirect acknowledgement timer is elapsed, wherein said indirect acknowledgement controller, in case the received acknowledgement packet from the receiver is a new acknowledgement packet, includes;

an updating means for updating the size of the buffer by calculating a round trip time (RTT) of the wireless link based on the received acknowledgement packet;

a deletion means for deleting data packet corresponding to the received acknowledgement packet from the buffer;

an establishment means for establishing the indirect acknowledgement timer to the data packet, which is a next stored data packet of the deleted data packet; and a determination means for determining whether the indirect acknowledgement packet of the data packet corresponding to the received acknowledgement packet is already transmitted to the transmitter and transmitting the received acknowledgement packet if the indirect acknowledgment packet is not transmitted.

9. The apparatus as recited in claim 8, further comprising a duplicate acknowledgement controller for determining whether the received acknowledgement packet is a duplicate acknowledgement packet, retransmitting a data packet corresponding to the received acknowledgement packet in case the received acknowledgement packet is the first duplicate acknowledgement packet and the data packet is stored in the buffer and counting a number of received duplicate acknowledgement packet.

10. The apparatus as recited in claim 8, wherein the updating means updates a size of buffer according to a value calculated by an equation as:

$$\text{Size of buffer} = \frac{RTT \text{ of wireless link} + \text{retransmission time out of base station}}{RTT \text{ of wireless link}}.$$

11. The apparatus as recited in claim 8, wherein said indirect acknowledgement controller includes:
- an indirect acknowledgement packet generation means for generating an indirect acknowledgement packet of a data packet of which an indirect acknowledgement timer is elapsed in case the received acknowledgement packet from the receiver is not transmitted until the indirect acknowledgement timer is elapsed and the buffer is not overflowed; and
- an establishing means for establishing the indirect acknowledgement timer of a data packet which is a next data packet of the data packet of which the indirect acknowledgement timer is elapsed in the buffer.

12. The apparatus as recited in claim 8, wherein said indirect acknowledgement controller includes:
- a record means for recording an arrival time of the data packet received from the transmitter; and
- an establishment means for establishing the indirect acknowledgement timer of the received data packet in case a number of data packet in the buffer is not greater than "1".

13. The apparatus as recited in claim 8, wherein said indirect acknowledgement controller updates a number of local retransmission in case the received data packet from the transmitter is not new data packet, and transmits the received data packet to said transceiver for the receiver.

14. The apparatus as recited in claim 8, wherein said indirect acknowledgement controller encapsulates a congestion information into a header of the received data packet in case the received data packet from the transmitter is not received orderly, and transmits the received data packet to said transceiver for the receiver.

15. A computer-readable medium storing instructions for executing a method for transmitting a packet in a packet transmission apparatus, the method comprising the steps of:
- a) setting up an indirect acknowledgement timer to a data packet received from the transmitter, storing the data packet into a buffer and transmitting the data packet to the receiver;
- b) updating a size of the buffer based on a acknowledgement packet received from the receiver and treating the data packet received from the transmitter; and
- c) transmitting an indirect acknowledgement packet to the transmitter according to a state of the buffer in case an acknowledgement packet is not received from the receiver until the indirect acknowledgement timer is elapsed, wherein step b) includes the steps of:
- b1) if the acknowledgment packet is a new acknowledgement packet, changing a size of the buffer by calculating a round trip time (RTT) of the wireless link;
- b2) deleting the data packet corresponding to the acknowledgement packet received from the buffer;
- b3) setting up the indirect acknowledgement timer to a data packet stored in the buffer, which is the next data packet of the deleted data packet; and
- b4) determining whether the indirect acknowledgement packet of the data packet corresponding to said received acknowledgement packet is transmitted, and if the indirect acknowledgement packet is not transmitted, transmitting the received acknowledgement packet to the transmitter.

\* \* \* \* \*